(12) United States Patent
Appa et al.

(10) Patent No.: US 7,679,249 B2
(45) Date of Patent: Mar. 16, 2010

(54) CONTRA ROTATING GENERATOR

(76) Inventors: Kari Appa, 22242 Anthony Dr., Lake Forest, CA (US) 92630; Suri Narayan Appa, 22242 Anthony Dr., Lake Forest, CA (US) 92630

( * ) Notice: Subject to any disclaimer, the term of this patent is extended or adjusted under 35 U.S.C. 154(b) by 265 days.

(21) Appl. No.: 12/032,712

(22) Filed: Feb. 18, 2008

(65) Prior Publication Data
US 2008/0211236 A1    Sep. 4, 2008

Related U.S. Application Data

(60) Provisional application No. 60/904,500, filed on Mar. 2, 2007.

(51) Int. Cl.
*H02K 16/00* (2006.01)
*H02K 7/18* (2006.01)
*F03D 1/02* (2006.01)
(52) U.S. Cl. .................. 310/114; 290/1 C; 290/4 R; 290/55
(58) Field of Classification Search ............... 310/114; 290/1 C, 44, 55
See application file for complete search history.

(56) References Cited

U.S. PATENT DOCUMENTS

| | | | |
|---|---|---|---|
| 3,974,396 A * | 8/1976 | Schonball | ............ 290/54 |
| 4,213,057 A | 7/1980 | Are | |
| 5,506,453 A | 4/1996 | McCombs | |
| 5,959,385 A * | 9/1999 | Kato et al. | ............ 310/112 |
| 6,127,739 A | 10/2000 | Appa | |
| 6,278,197 B1 | 8/2001 | Appa | |
| 6,492,743 B1 | 12/2002 | Appa | |
| 6,504,260 B1 | 1/2003 | Debleser | |
| 6,975,045 B2 | 12/2005 | Kurachi et al. | |
| 7,384,239 B2 * | 6/2008 | Wacinski | ............ 416/128 |
| 2008/0100168 A1 * | 5/2008 | Bremner | ............ 310/162 |
| 2008/0197639 A1 * | 8/2008 | Brander | ............ 290/55 |
| 2009/0243411 A1 * | 10/2009 | Moeller | ............ 310/90 |

FOREIGN PATENT DOCUMENTS

WO    WO9212343 A1    7/1992
WO    WO 9618815 A1 *    6/1996

* cited by examiner

*Primary Examiner*—Burton Mullins
(74) *Attorney, Agent, or Firm*—Ash Tankha

(57) ABSTRACT

Disclosed herein is an apparatus of a contra rotating generator. The contra rotating generator comprises a cylindrical armature supported on an inner shaft. The inner shaft rotates in a first direction. A cylindrical magnetic field rotor is supported on an outer shaft. The outer shaft is oriented coaxially to the inner shaft. The outer shaft contra rotates opposite to the first direction. A plurality of cam followers maintains uniform air gap between outer surface of the cylindrical armature and inner surface of the cylindrical magnetic field rotor. The uniform air gap prevents mechanical contact between the cylindrical armature and the cylindrical magnetic field rotor. A sprag clutch prevents unidirectional rotation of the inner shaft and the outer shaft. The contra rotation between the cylindrical armature and the cylindrical magnetic field rotor increases relative magnetic flux speed for generating electrical power at low speeds of operation.

12 Claims, 9 Drawing Sheets

CONTRA ROTATING GENERATOR

CROSS REFERENCE TO RELATED APPLICATIONS

This application claims the benefit of provisional patent application U.S. No. 60/904,500 titled "Contra Rotating Generators for Multi-Megawatt Scale Wind Turbines", filed on "Mar. 2, 2007" in the United States Patent and Trademark Office.

BACKGROUND

This invention, in general, relates to electrical generators. More particularly, this invention relates to a contra rotating generator apparatus for increasing relative magnetic flux speed.

Electrical generators, in general, comprise a single rotating component called a rotor. The rotor may be either a coil wound armature or a magnetic field unit. The single rotating component of such electrical generators when designed for low rotational speeds, for example, in the range of 10 to 20 revolutions per minute, are large in physical dimensions and weight. Typically, in wind turbines, the power generated by the generator is proportional to the square of rotor blade diameter and hence there is a growing trend to build large diameter rotors, for example larger than 100 meters with each rotor blade weighing over 6 tons. The large rotor blades increase tower head weights to about 100 to 400 tons and require higher tower heights. Moreover, the fabrication of large rotor blades at wind farm sites may not be economical unless a minimum number of rotor blades are built at the same wind farm site. Furthermore, the rotor blade root-bending moment and the required wall thickness of the rotor blade increases with the square of blade length, resulting in heavier blades that further increase tower head weight. The generators with large rotor blades may therefore be difficult to transport, install, and maintain in rural or wild terrain environments.

Although in existing contra rotating wind turbines a first rotor and a second rotor rotate in opposite direction, the magnetic field between the armature and the magnetic field unit creates a cogging torque between the first rotor and the second rotor. The cogging torque causes the second rotor of the wind turbine to rotate in the same direction as the first rotor instead of the opposite direction at low wind speeds. Moreover, due to the heavy weight of the armature, an excess amount of aerodynamic torque may be required to start the rotors rotating, Furthermore, due to small air gap between the armature and the magnetic field unit of the contra rotating wind turbines, the first rotor and the second rotor may come in contact while rotating, thereby resulting in damage of the contra rotating wind turbine.

Hence, there is a need for a contra rotating generator apparatus to increase relative magnetic flux speed with reduced generator physical dimensions, weight, and cost.

SUMMARY OF THE INVENTION

The contra rotating generator apparatus disclosed herein addresses the above stated need to increase relative magnetic flux speed with reduced generator physical dimensions, weight, and cost.

The contra rotating generator apparatus comprises a cylindrical armature supported on an inner shaft. The cylindrical armature comprises current carrying elements. The inner shaft rotates in a first direction. A cylindrical magnetic field rotor is supported on an outer shaft. The outer shaft is oriented coaxially to the inner shaft. The outer shaft contra rotates in a second direction opposite to the first direction. The inner shaft is driven by a first prime mover and the outer shaft is driven by a second prime mover.

Multiple cam followers maintain uniform air gap between the outer surface of the cylindrical armature and the inner surface of the cylindrical magnetic field rotor. The uniform air gap prevents mechanical contact between the cylindrical armature and the cylindrical magnetic field rotor. A sprag clutch prevents unidirectional rotation of the inner shaft and the outer shaft. The contra rotation between the cylindrical armature and the cylindrical magnetic field rotor increases relative magnetic flux speed for generating electrical power at low rotational speeds of the cylindrical magnetic field rotor. The relative magnetic flux speed is the sum of rotational speed of the cylindrical armature and the rotational speed of the cylindrical magnetic field rotor. The contra rotation induces an electric current in the cylindrical armature. Multiple slip rings transport the induced electric current to an external unit. An air gap is maintained at a minimal distance between the cylindrical armature and the cylindrical magnetic field rotor for increasing electromagnetic coupling between the cylindrical armature and the cylindrical magnetic field rotor.

The cylindrical magnetic field rotor comprises an induction means to produce magnetic flux in the air gap. The induction means comprises one of permanent magnets, magnetic field generating field coils, and a combination thereof. The contra rotating generator further comprises a first laminated yoke for the cylindrical armature and a second laminated yoke for the cylindrical magnetic field rotor. The laminations of the first laminated yoke and the second laminated yoke comprise segmented stampings with an interlocking mechanism and multiple bolt holes. The second laminated cylindrical yoke comprises multiple slots for permanent magnets. The first laminated yoke and the second laminated yoke comprise cylindrical shells of composite materials. The composite materials stiffen the cylindrical shells, minimize aerodynamic drag between the cylindrical armature and the cylindrical magnetic field rotor, and reduce weight of the cylindrical armature and the cylindrical magnetic field rotor.

Multiple end caps and multiple bolts inserted in the bolt holes anchor the first laminated yoke and the second laminated yoke. The contra rotating generator further comprises one or more of bolts, end covers, honeycomb structures, and woven composite fabrics for providing shear stiffness and bending stiffness to support weight and torsion loads of the cylindrical armature and the cylindrical magnetic field rotor. The honeycomb structures provide an air passage for circulation of air through the cylindrical armature and the cylindrical magnetic field rotor. The air circulation cools the cylindrical armature and the cylindrical magnetic field rotor. The aforementioned contra rotating generator may be used in the development of multi-megawatt wind turbines, water turbines, and gas turbines foreseen to exist in present and future power generation technologies.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
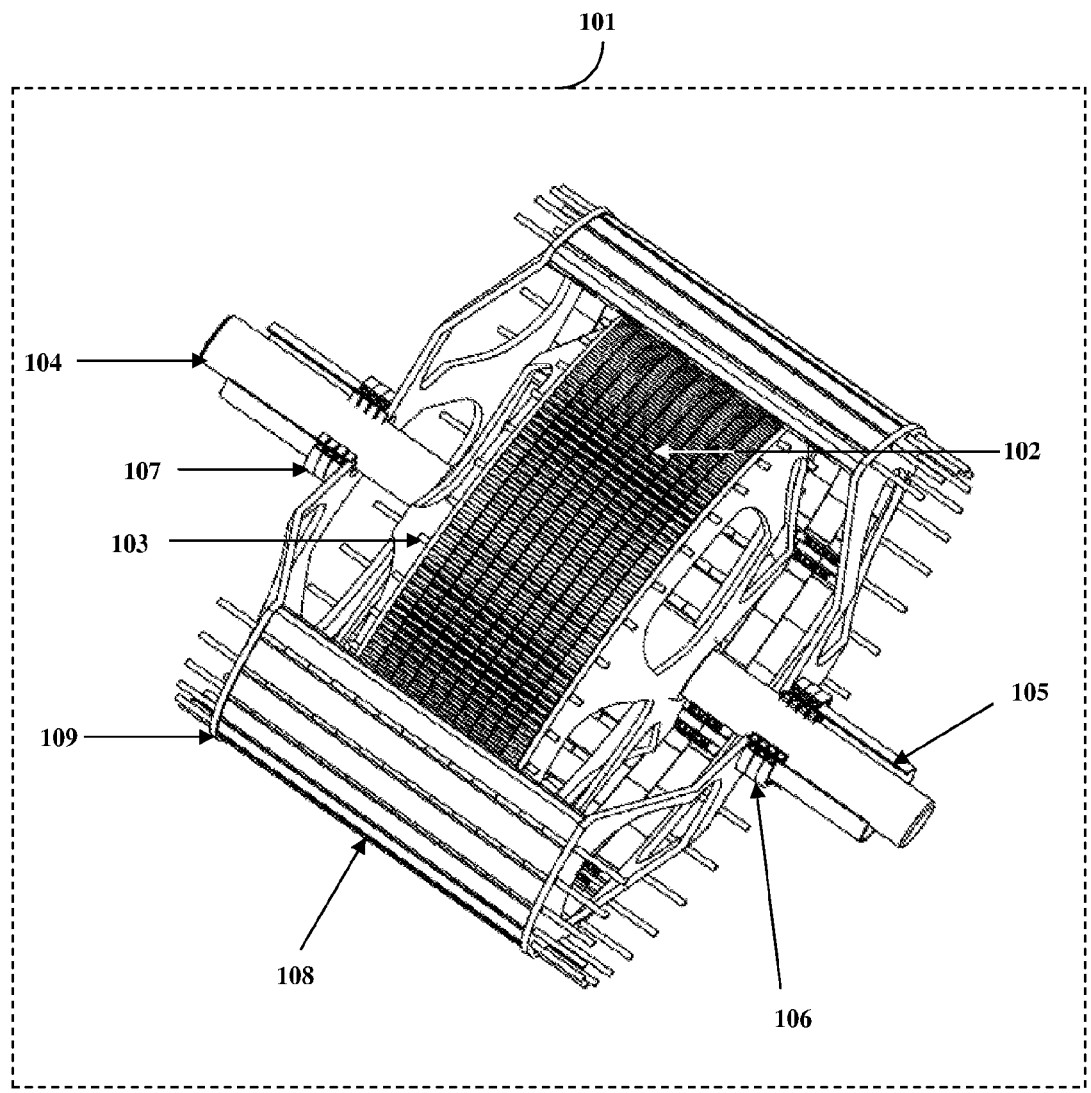
FIG. 1 exemplarily illustrates a contra rotating generator assembly.
Figure 7:
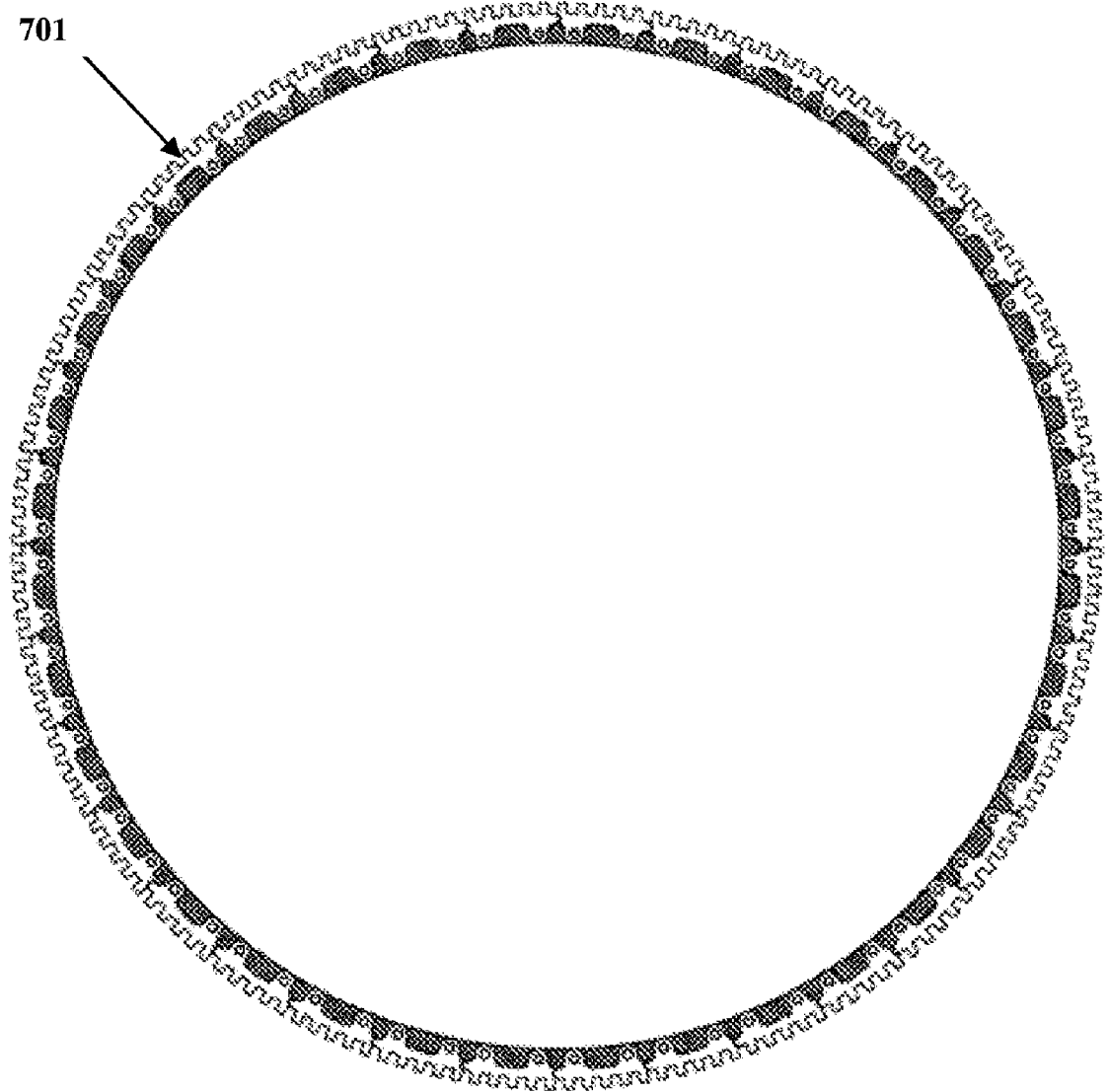
FIG. 7 exemplarily illustrates a cross-sectional view of the coil wound cylindrical armature unit.
Figure 8:
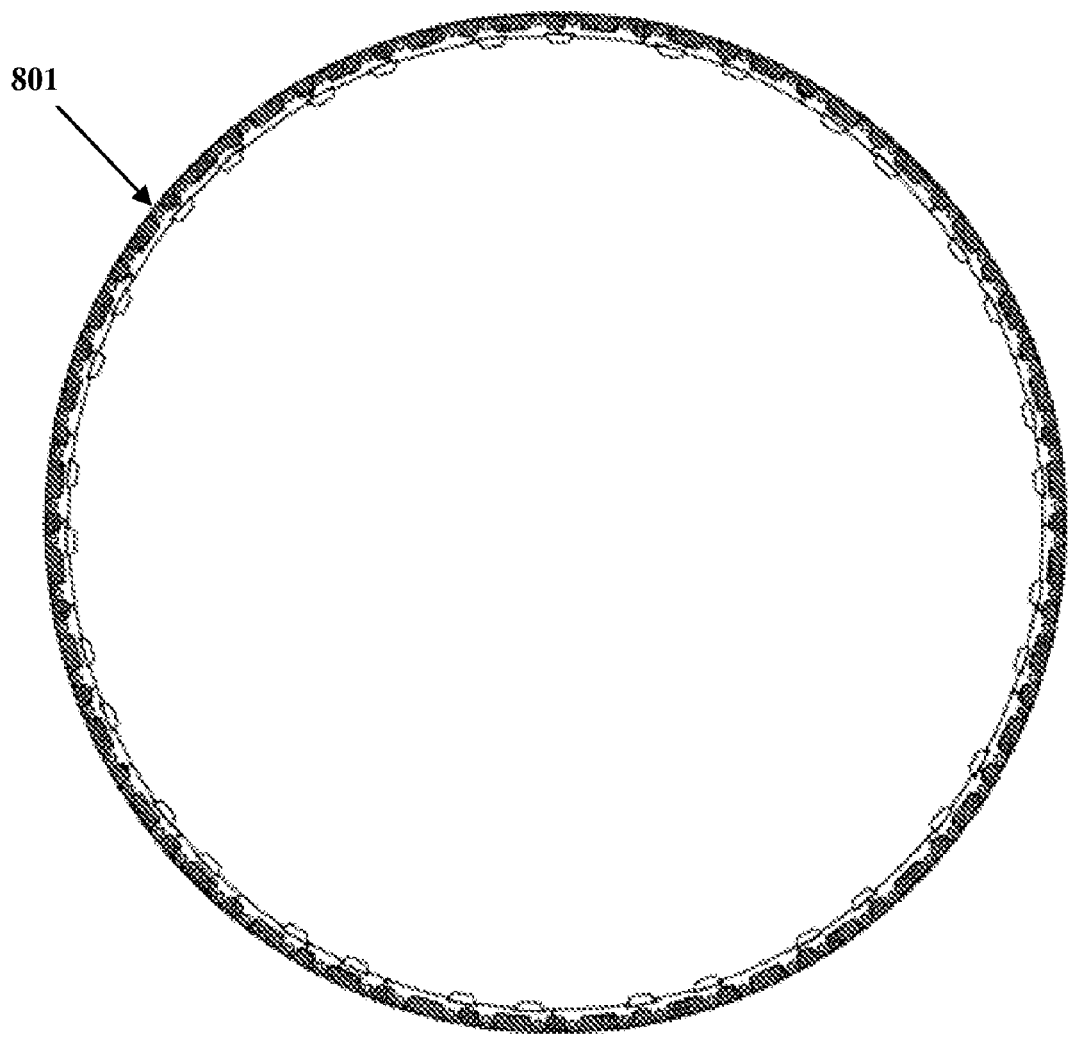
FIG. 8 exemplarily illustrates a cross-sectional view of the cylindrical magnetic field rotor unit.

FIG. 1 exemplarily illustrates a contra rotating generator assembly. The contra rotating generator 101 comprises a cylindrical armature 102 supported on an inner shaft 104. The cylindrical armature 102 comprises current carrying elements. The inner shaft 104 rotates in a first direction. A cylindrical magnetic field rotor 108 is supported on an outer shaft 105. The outer shaft 105 is oriented coaxially to the inner shaft 104. The outer shaft 105 contra rotates in a second direction opposite to the first direction. The inner shaft 104 is driven by a first prime mover 901 and the outer shaft 105 is driven by a second prime mover 902. The coaxial inner shaft 104 and the outer shaft 105 are mounted on two inner bearings. The cross-sectional view 701 of the cylindrical armature 102 and the cross-sectional view 801 of the cylindrical magnetic field rotor 108 are illustrated in FIG. 7 and FIG. 8 respectively. The cylindrical armature 102 comprises a set of first interlocking segmented stampings 401 secured by armature bolts 103. The cylindrical magnetic field rotor 108 comprises a set of second interlocking segmented stampings 501 secured by rotor bolts 109.

Multiple cam followers 601 maintain a uniform air gap between outer surface of the cylindrical armature 102 and inner surface of the cylindrical magnetic field rotor 108. The uniform air gap prevents mechanical contact between the cylindrical armature 102 and the cylindrical magnetic field rotor 108. The magnetic field between the cylindrical armature 102 and the cylindrical magnetic field rotor 108 creates a cogging torque at low wind speeds. The cogging torque causes the inner shaft 104 and the outer shaft 105 to rotate unidirectionally. A sprag clutch 106 provided on one of the inner shaft and the outer shaft prevents unidirectional rotation of the inner shaft 104 and the outer shaft 105.

The contra rotation between the cylindrical armature 102 and the cylindrical magnetic field rotor 108 increases relative magnetic flux speed for generating electrical power at low rotational speeds of the cylindrical magnetic field rotor 108. The relative magnetic flux speed is the sum of rotational speed of the cylindrical armature 102 and the rotational speed of the cylindrical magnetic field rotor 108. The contra rotation induces an electric current in the cylindrical armature 102. Multiple slip rings 107 transport the induced electric current to an external unit. The slip rings 107 may be of a contact type or non-contact type, for example, the emerging mercury based slip rings 107 of Mercotac®.

Figure 2:
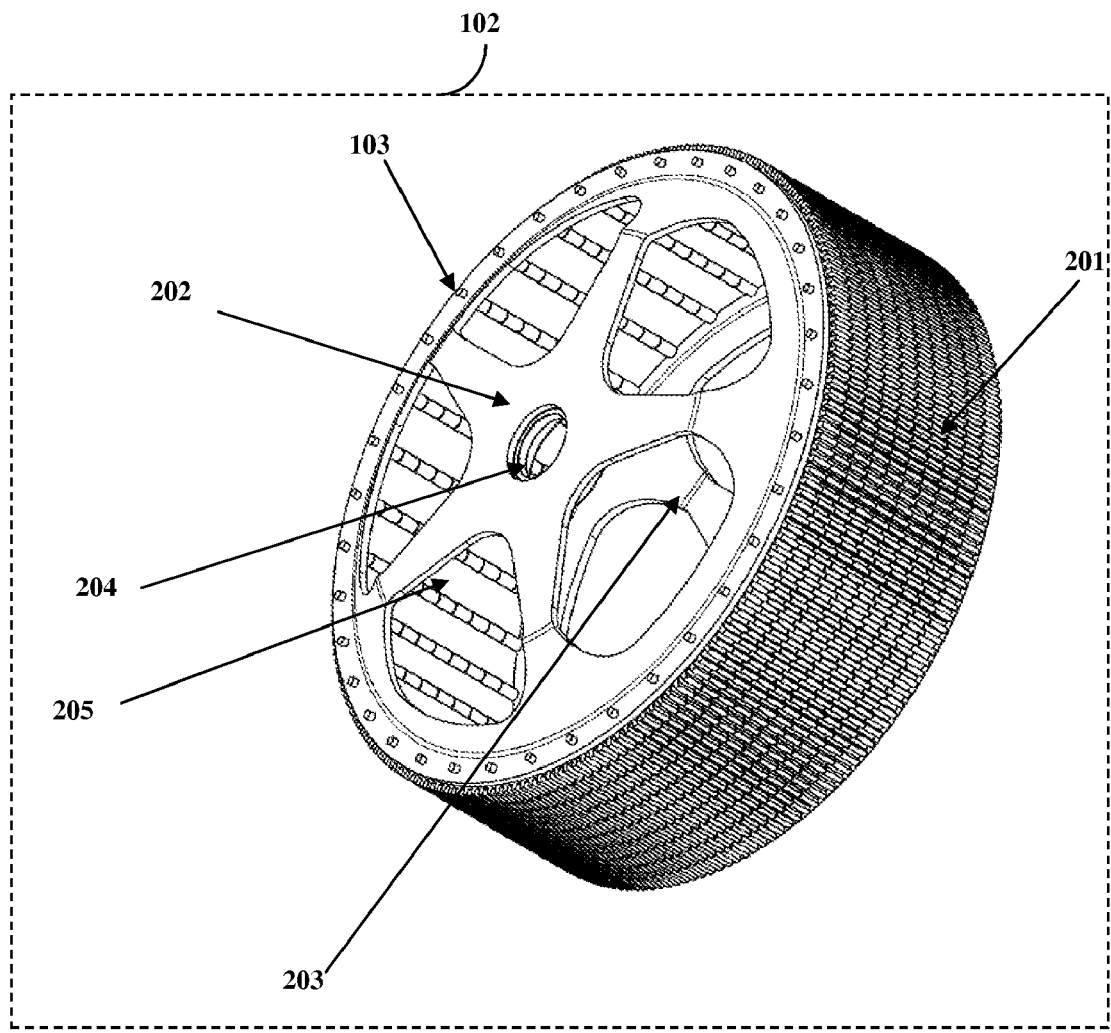
FIG. 2 exemplarily illustrates an assembly of a cylindrical armature unit.
Figure 4:
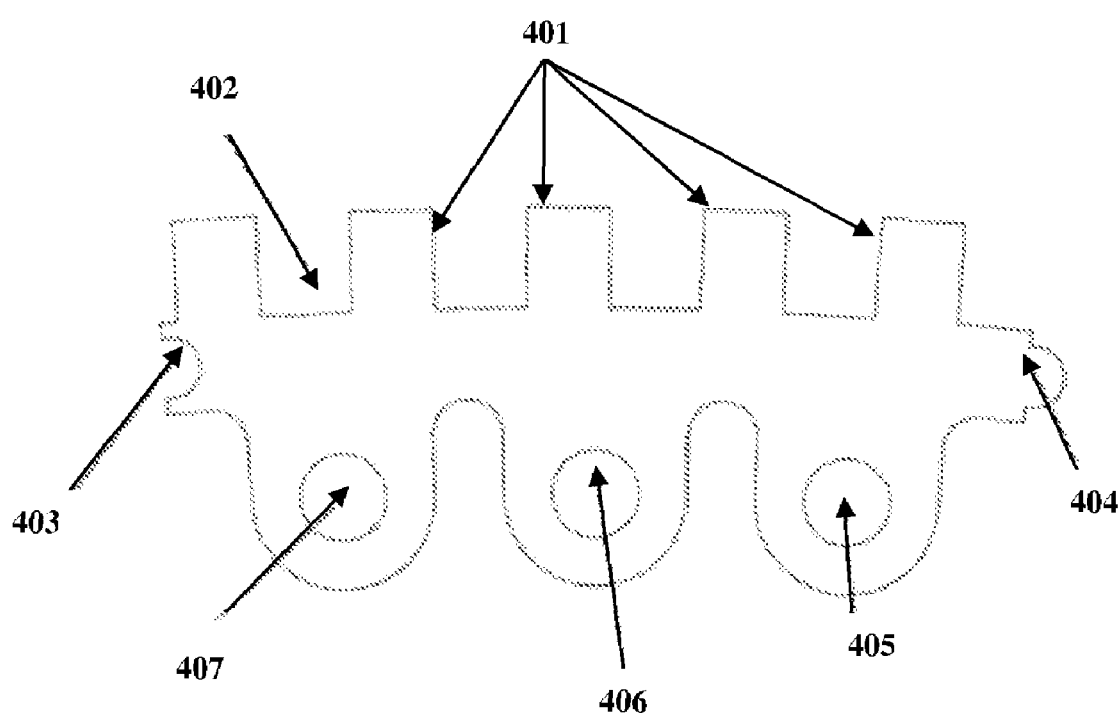
FIG. 4 exemplarily illustrates a first laminated yoke of the cylindrical armature unit.

FIG. 2 exemplarily illustrates an assembly of a cylindrical armature unit. The contra rotating generator 101 comprises a first laminated yoke for the cylindrical armature 102. The first laminated yoke comprises segmented cylindrical laminates 201. Further, the first laminated yoke comprises segmented stampings 401 having an interlocking mechanism and multiple bolt holes 405, 406, and 407. The first laminated yoke is exemplarily illustrated in FIG. 4. Each segmented stamping 401 is provided with multiple slots 402 for housing the current carrying copper wires 603. Further, interlocking side edges 403 and 404, and three bolt holes 405, 406, and 407 are provided to fasten overlapping and interlocking cylindrical yoke laminates 201 in a longitudinal direction by using the armature bolts 103. Metallic or non-metallic honeycomb like shear resistant structural components herein referred to as honeycomb structures 205 may be glued to the inner surface of the first laminated yoke between each pair of the armature bolts 103.

Bolt holes, exemplarily 405, 406, or 407, in subsequent layers may be overlapped so that the first laminated yoke can be firmly fastened to ensure radial and circumferential stiffness. A staggered and interlocking approach is used to form cylindrically shaped shells in the first laminated yoke of the cylindrical armature 102. The cylindrically shaped shells comprise composite materials. The composite materials stiffen the cylindrical shells, minimize aerodynamic drag between the cylindrical armature 102 and the cylindrical magnetic field rotor 108, and reduce the weight of the cylindrical armature 102. Multiple end caps 202 and 203 and the armature bolts 103 inserted in the bolt holes 405, 406, and 407, anchor the first laminated yoke.

A sleeved opening 204 in each end cap 202 and 203 is used to assemble the inner shaft 104. Since the current carrying cylindrical armature 102 may be relatively heavier than the cylindrical magnetic field rotor 108, additional bulkheads similar to the end caps 202 and 203 in the center of armature core may be used to provide additional stiffness against weight of the armature core. The effective reduction in weight of the cylindrical armature unit due to light weight components reduces the amount of aerodynamic torque required to rotate the cylindrical armature 102. The aerodynamic torque or applied torque is the external torque applied to the contra rotating generator's 101 axis of rotation.

Figure 3:
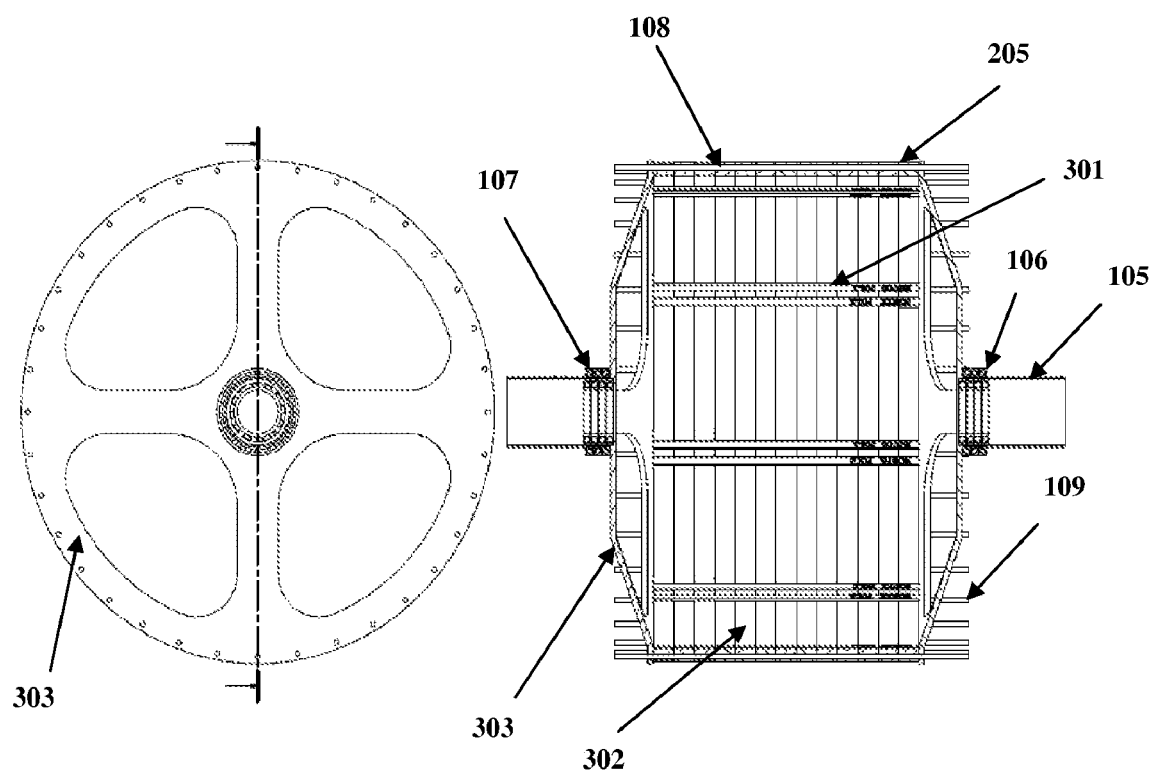
FIG. 3 exemplarily illustrates an assembly of a cylindrical magnetic field rotor unit.
Figure 5:
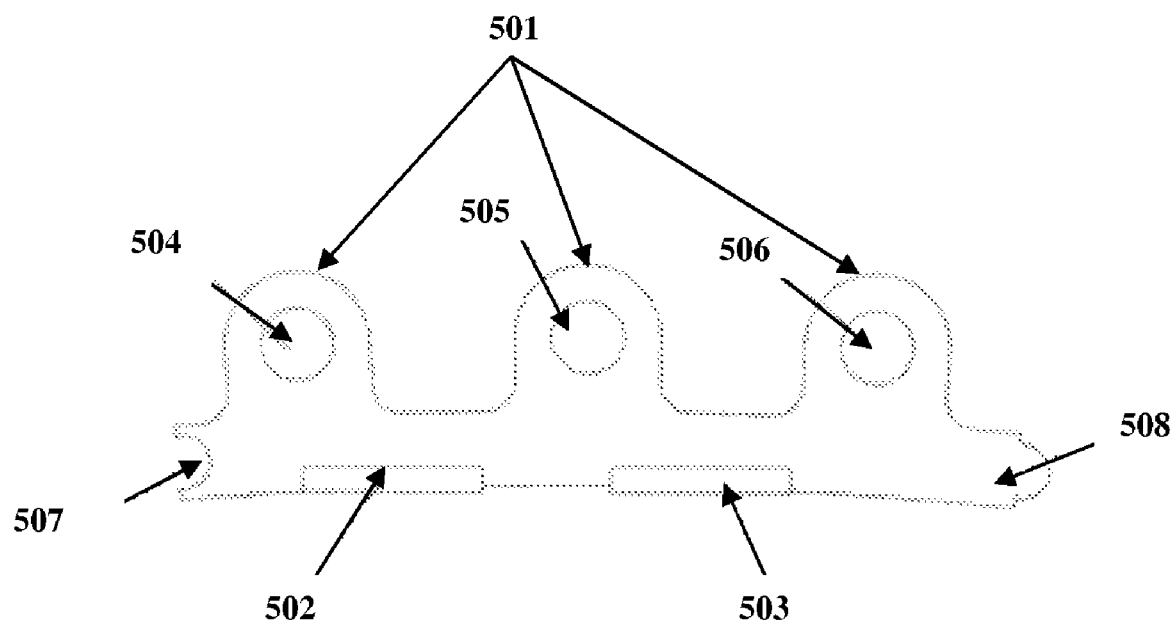
FIG. 5 exemplarily illustrates a second laminated yoke of the cylindrical magnetic field rotor unit.

FIG. 3 exemplarily illustrates an assembly of a cylindrical magnetic field rotor 108 unit. The contra rotating generator 101 comprises a second laminated yoke for the cylindrical magnetic field rotor 108. The second laminated yoke comprises cylindrical yoke laminates 302 built up of segmented and interlocking stampings 501 as illustrated in FIG. 5. Each segmented stamping 501 has a pair of bolt holes 504, 505, and 506, interlocking edges 507 and 508, and multiple slots 502 and 503 for positioning permanent magnets 301 or the current carrying copper wires 603 as in the case of induction generators. Metallic or non-metallic honeycomb structures 205 may be glued to the inner surface of the second laminated yoke between each pair of the rotor bolts 109.

A pair of end caps 303 fastens the second laminated yoke by means of the rotor bolts 109. The pair of end caps 303 is provided with splined recess in the center to fasten the outer shaft 105. The cylindrical magnetic field rotor 108 comprises an induction means to produce magnetic flux in the air gap. The induction means comprise one of permanent magnets 301, magnetic field generating field coils, and a combination thereof. The permanent magnets 301 generate the magnetic flux density in an air gap between the cylindrical armature 102 and the cylindrical magnetic field rotor 108. An air gap is maintained at a minimal distance between the cylindrical armature 102 and the cylindrical magnetic field rotor 108 for increasing electromagnetic coupling between the cylindrical armature 102 and the cylindrical magnetic field rotor 108.

The second laminated cylindrical yokes comprise cylindrical shells of composite materials. The composite materials stiffen the cylindrical shells, minimize aerodynamic drag between the cylindrical armature 102 and the cylindrical magnetic field rotor 108, and reduce weight of the cylindrical magnetic field rotor 108. Multiple end caps 303 and the rotor bolts 109 inserted in the bolt holes 504, 505, and 506, anchor the second laminated yoke.

Figure 6:
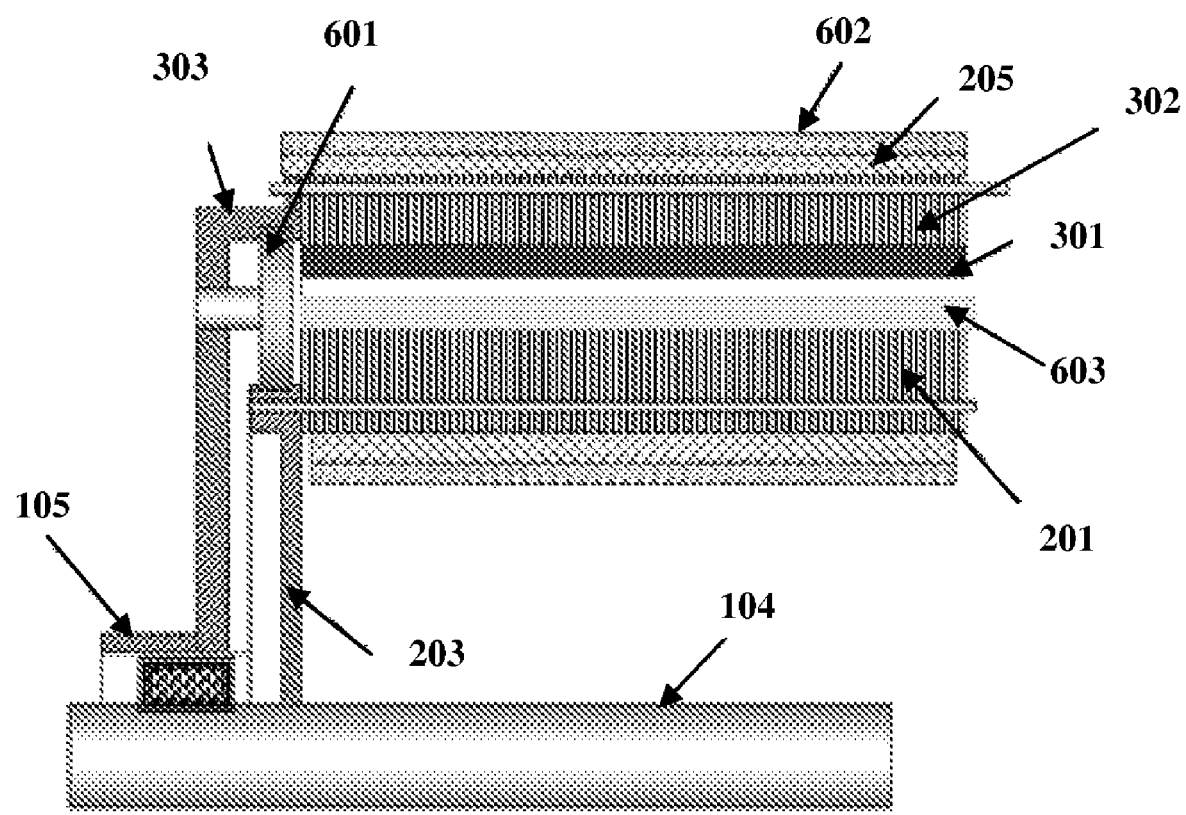
FIG. 6 exemplarily illustrates a cross-sectional view of the contra rotating generator with a cam follower assembly.

FIG. 6 exemplarily illustrates a cross-section view of the contra rotating generator with a cam follower assembly. Multiple cam followers 601 maintains uniform air gap between outer surface of the cylindrical armature 102 and inner surface of the cylindrical magnetic field rotor 108. The uniform air gap prevents mechanical contact between the cylindrical armature 102 and the cylindrical magnetic field rotor 108.

The electric generators, in general, require minimum air gap to ensure a strong magnetic field for the efficient production of power. The air gap width is 0.1 percent of the air gap diameter or 1 millimeter (mm) for small generators. Generators producing mega watt power typically spin at 10 to 20 revolutions per minute (rpm). Further the air gap diameter is in the order of 10 m, and the air gap width is in the order of 5 mm. To provide a uniform air gap, the cam followers 601 are installed between the inner and outer end covers as illustrated in FIG. 6. Multiple bolts 103 and 109, end covers, the honeycomb structures 205, and woven composite fabrics 602 in the contra rotating generator 101 provide shear stiffness and bending stiffness to support weight and torsion loads of the cylindrical armature 102 and the cylindrical magnetic field rotor 108. The current carrying copper wires 603 are housed in multiple slots 402.

The honeycomb structures 205 are placed between the bolts 103 and 109 to minimize weight. Further, the honeycomb structures 205 provide an air passage for circulation of air through the cylindrical armature 102 and the cylindrical magnetic field rotor 108. The air circulation cools the cylindrical armature 102 and the cylindrical magnetic field rotor 108.

Figure 9:
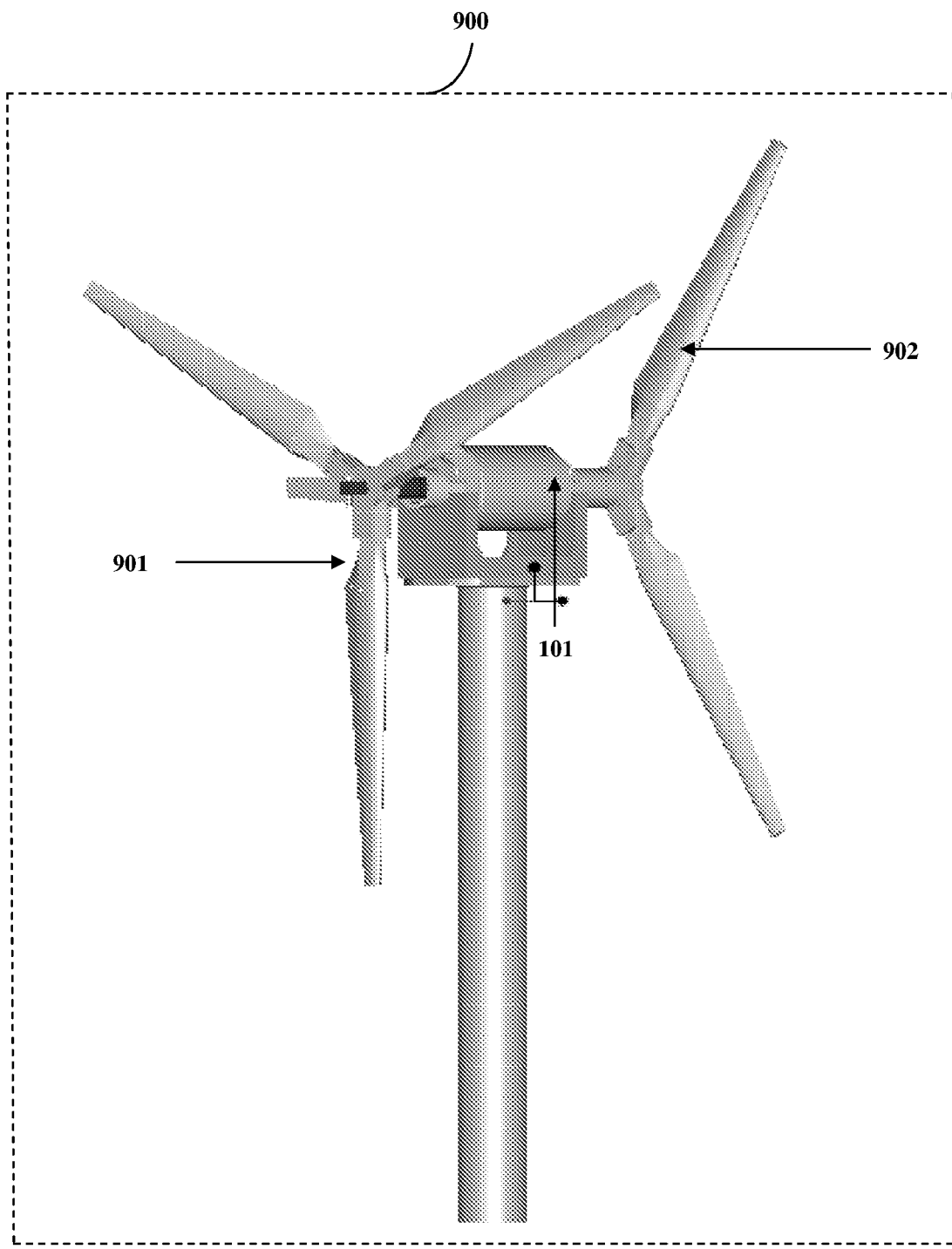
FIG. 9 exemplarily illustrates a contra rotating wind turbine system assembly.

In addition, many layers of woven composite fabrics 602, either glass fiber or carbon fiber may be fixed, for example by an adhesive, to the outer surface of the honeycomb structures 205. The woven composite fabrics 602 provide the required shear and bending stiffness to transmit high torque for producing multi megawatts of electrical power. In an embodiment of the apparatus disclosed herein, the magnetic field yoke may partially surround the wound armature unit. The magnetic field yoke may also be positioned at equi-spaced distances around the wound armature unit. The contra rotating multi-megawatt generator unit comprising relatively small light weight components may be easily elevated to a tower platform and assembled without the need of a heavy duty crane which is difficult to maneuver in uneven or wild terrains. The apparatus disclosed herein may be used in multi-megawatt wind turbines, water turbines, and gas turbines. A contra rotating wind turbine system assembly 900 comprising the contra rotating generator 101, the first prime mover 901, and the second prime mover 902 is exemplarily illustrated in FIG. 9.

The foregoing examples have been provided merely for the purpose of explanation and are in no way to be construed as limiting of the present apparatus disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A contra rotating generator apparatus, comprising:
   a cylindrical armature supported on an inner shaft, wherein said inner shaft rotates in a first direction;
   a cylindrical magnetic field rotor supported on an outer shaft, wherein said outer shaft is oriented coaxially to the inner shaft, further wherein the outer shaft contra rotates in a second direction opposite to said first direction;
   a plurality of cam followers for maintaining a uniform air gap between outer surface of said cylindrical armature and inner surface of said cylindrical magnetic field rotor; wherein said uniform air gap prevents mechanical contact between the cylindrical armature and the cylindrical magnetic field rotor; and
   a sprag clutch provided on one of the inner shaft and the outer shaft, wherein said sprag clutch prevents unidirectional rotation of the inner shaft and the outer shaft;
   whereby said contra rotation between the cylindrical armature and the cylindrical magnetic field rotor increases relative magnetic flux speed for generating electrical power at low rotational speeds of operation of a contra rotating generator.

2. The apparatus of claim 1, wherein an air gap is maintained at a minimal distance between the cylindrical armature and the cylindrical magnetic field rotor for increasing electromagnetic coupling between the cylindrical armature and the cylindrical magnetic field rotor.

3. The apparatus of claim 1, wherein the cylindrical magnetic field rotor comprises an induction means to produce magnetic flux in the air gap, wherein said induction means comprises one of a plurality of permanent magnets, magnetic field generating field coils, and a combination thereof.

4. The apparatus of claim 1, further comprising a first laminated yoke for the cylindrical armature and a second laminated yoke for the cylindrical magnetic field rotor, wherein laminations of said first laminated yoke and said second laminated yoke comprise segmented stampings with an interlocking mechanism and a plurality of bolt holes.

5. The apparatus of claim 4, wherein the second laminated yoke comprises a plurality of slots for inserting permanent magnets.

6. The apparatus of claim 4, wherein the first laminated yoke and the second laminated yoke comprise cylindrical shells of composite materials, wherein said composite materials stiffen said cylindrical shells, minimize aerodynamic drag between the cylindrical armature and the cylindrical magnetic field rotor, and reduces weight of the cylindrical armature and the cylindrical magnetic field rotor.

7. The apparatus of claim 4, further comprising a plurality of end caps and a plurality of bolts inserted in said bolt holes for anchoring the first laminated yoke and the second laminated yoke.

8. The apparatus of claim 1, further comprising one or more of a plurality of bolts, end covers, honeycomb structures, and woven composite fabrics for providing shear stiffness and bending stiffness to support weight and torsion loads of the cylindrical armature and the cylindrical magnetic field rotor.

9. The apparatus of claim 8, wherein said honeycomb structures provide an air passage for circulation of air through the cylindrical armature and the cylindrical magnetic field rotor, wherein said air circulation cools the cylindrical armature and the cylindrical magnetic field rotor.

10. The apparatus of claim 1, wherein the cylindrical armature comprises a plurality of current carrying elements.

11. The apparatus of claim 1, further comprising a plurality of slip rings for transporting electric current generated in the cylindrical armature to an external unit.

12. The apparatus of claim 1, wherein the inner shaft is driven by a first prime mover and the outer shaft is driven by a second prime mover.

* * * * *